United States Patent [19]

Haragushi

[11] Patent Number: 4,843,490
[45] Date of Patent: Jun. 27, 1989

[54] SYSTEM FOR DISCRIMINATING BETWEEN TWO TAPE ASSEMBLIES OF DIFFERENT RECORDING CHARACTERISTICS TO BE LOADED INTERCHANGEABLY IN DATA TRANSFER APPARATUS

[75] Inventor: Tamotsu Haragushi, Musashino, Japan

[73] Assignee: Teac Corporation, Tokyo, Japan

[21] Appl. No.: 170,826

[22] Filed: Mar. 21, 1988

[30] Foreign Application Priority Data

Mar. 27, 1987 [JP]  Japan .................................. 62-75076

[51] Int. Cl.$^4$ ........................... G11B 5/02; G11B 5/03
[52] U.S. Cl. ......................................... 360/69; 360/66
[58] Field of Search ..................................... 360/69, 66

[56] References Cited

U.S. PATENT DOCUMENTS

| | | | |
|---|---|---|---|
| 4,037,259 | 7/1977 | Hammon et al. | 360/66 |
| 4,288,827 | 9/1981 | Sato | 360/66 |
| 4,297,730 | 10/1981 | Kadowaki et al. | 360/66 |
| 4,352,130 | 9/1982 | Hasegawa et al. | 360/66 |
| 4,528,602 | 7/1985 | Crick et al. | 360/66 |
| 4,553,179 | 11/1985 | Inami et al. | 360/66 |
| 4,583,134 | 4/1986 | Nakamichi | 360/69 |
| 4,616,273 | 10/1986 | Ishii et al. | 360/66 |
| 4,713,700 | 12/1987 | Kuwahara et al. | 360/66 |

Primary Examiner—Robert S. Tupper
Attorney, Agent, or Firm—Woodcock Washburn Kurtz Mackiewicz & Norris

[57] ABSTRACT

A compatible data transfer apparatus for use with first and second tape assemblies such as multitrack digital magnetic tape cassettes on which data are recorded with different formats or with different densities. Typically, in order to discriminate between the two types of tape assemblies, a beginning-of-tape (BOT) sensor is utilized which optically detects a BOT hole usually formed in this kind of tape cassette. The two types of tape assemblies have their BOT holes formed at different distances from optically detectable starting position of the tape such as the boundary between the transport leader tape section and the opaque data storage section. The BOT sensor may be connected to a programmed microcomputer or to a devoted identification circuit whereby the loaded tape assembly is identified as the first or second type depending upon the distance of the BOT hole from the starting tape position. A tape select switch is automatically actuated for connecting the transducer to a reproduction circuit to either of two reproduction circuits provided for the two types of tape assemblies.

9 Claims, 4 Drawing Sheets

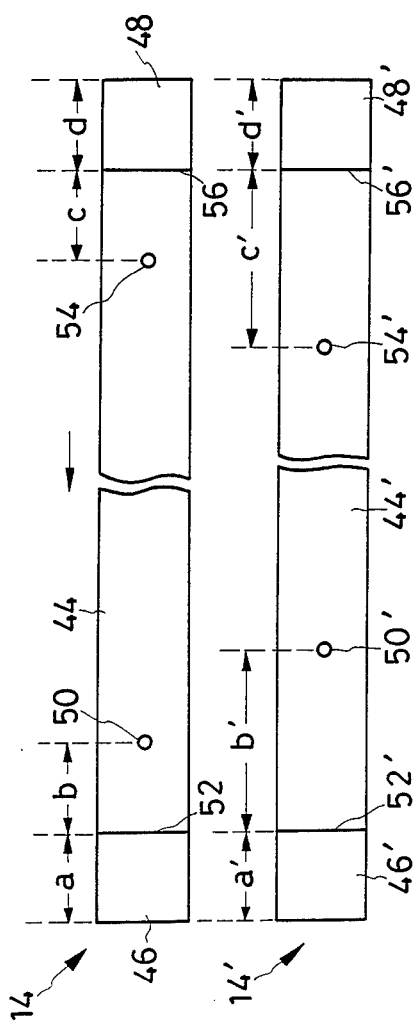
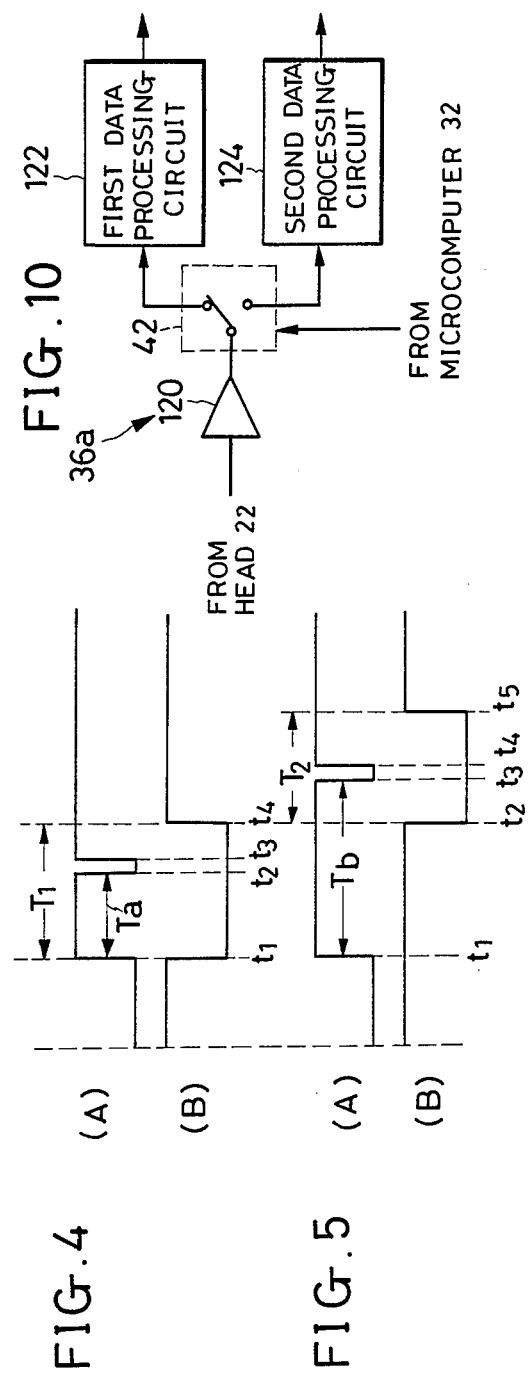
FIG. 2
FIG. 3
FIG. 4
FIG. 5
FIG. 10

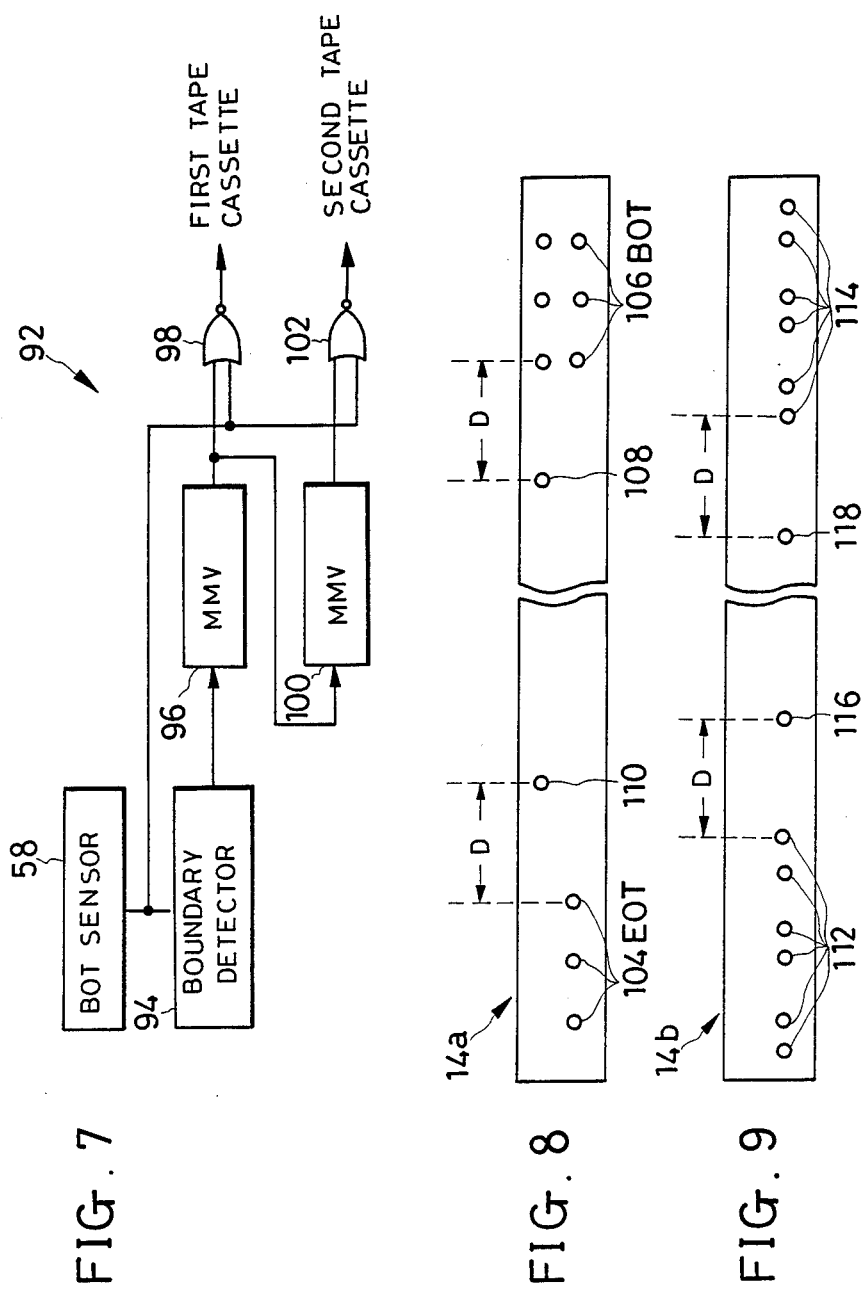

SYSTEM FOR DISCRIMINATING BETWEEN TWO TAPE ASSEMBLIES OF DIFFERENT RECORDING CHARACTERISTICS TO BE LOADED INTERCHANGEABLY IN DATA TRANSFER APPARATUS

BACKGROUND OF THE INVENTION

My invention relates to an apparatus for data transfer with two or more interchangeable tape cassettes or like tape assemblies in which data are stored with different recording characteristics, e.g. different formats or different recording densities, and which in consequence, demand different circuit means for data reproduction. More specifically, my invention pertains to a system incorporated in such compatible data transfer apparatus for discriminating between the two different types of tape assemblies as either of these is loaded in the apparatus, preparatory to the commencement of data transfer therewith. Typical examples of tape assemblies for use with the apparatus of my invention are multitrack magnetic tape cassettes for the storage of digitized audio signals.

An apparatus for data transfer with multitrack magnetic tape cassettes of the type under consideration is disclosed in U.S. Pat. No. 4,701,817 issued to Uemura and entitled, "Loading and Ejecting Mechanism for a Magnetic Tape Cassette Apparatus." In the field of magnetic tape media for the storage of digital data, attempts are being made for greater and greater storage capacities through an increase in recording density or in track density. Generally, the recording density becomes higher with an increase in the coercive force of the tape. There are commercially available today magnetic tape cassettes or other tape assemblies of distinctly different recording densities as well as of different formats. Thus the need arises for the provision of compatible data transfer apparatus which lends itself to use with two or more tape assemblies of different recording characteristics. Such compatible apparatus should permit the different tape assemblies to be loaded interchangeably therein, identify each loaded tape assembly, and adapt itself for data transfer with the particular type of tape assembly that has been identified as such.

I am aware that, particularly in the field of digital audio tape recorders or decks, a variety of methods and devices have been suggested for automatically identifying the recording density or format of each loaded tape assembly preparatory to the commencement of playback or recording. My objection to such known devices is that they are not so simple and inexpensive in construction as can be desired.

SUMMARY OF THE INVENTION

I have hereby invented how to establish the compatibility of the data transfer apparatus of the type in question with two or more different types of tape cassettes or like tape assemblies in a truly simple and thoroughly practicable manner.

Brief, my invention may be summarized as an apparatus capable of selective data transfer with first and second tape assemblies on which data are recorded in different ways. The first tape assembly includes a length of tape having an aperture formed therein at a first prescribed distance from an optically detectable starting position thereon. The second tape assembly likewise includes a length of tape, but with an aperture formed therein at a second prescribed distance, different from the first prescribed distance, from an optically detectable starting position thereof.

The data transfer apparatus comprises tape transport means for transporting the tape of the loaded first or second tape assembly past the transducer, and data reproduction circuit means connected to the transducer for selective data reproduction from the first and second tape assemblies. Included in the data reproduction circuit means is a tape select switch for selectively conditioning the same for data reproduction from the first or second tape assembly. In order to identify the loaded tape assembly as the first or second type, a sensor means is provided for optically detecting the aperture in the tape of the loaded first or second tape assembly, the sensor means producing an electric output indicative of the spacing between the starting position of the tape and the aperture therein. Also included is a control circuit responsive to the output from the sensor means for identifying the loaded first or second tape assembly on the basis of the spacing between the starting position of the tape of the loaded tape assembly and the aperture therein. The control circuit is connected to the tape select switch for actuating the same to condition the data reproduction circuit means for data reproduction from the loaded first or second tape assembly that has been identified as such.

In practice the usual beginning-of-tape hole in the tape of tape cassettes can be used as noted tape aperture, such a hole being positioned at a predetermined distance from the boundary between the leader tape portion and the data storage portion of the tape. Since the leader portion of the tape is transparent, and the data storage portion opaque, the boundary therebetween is optically detectable. Thus the beginning-of-tape sensor usually incorporated in this type of data transfer apparatus may be used as the sensor means of my invention. As will become apparent from the subsequent diclosure of some preferable embodiments, my invention requries little or no alteration in the design of the known multitrack digital tape cassette apparatus and of the tape cassettes for use therewith.

The above and other objects and advantages of my invention and the manner of realizing them will become more apparent, and the invention itself will best be understood, from a study of the following description and appended claims, with reference had to the attached drawings showing the preferred embodiments of my invention.

BRIEF DESCRIPTION OF THE DRAWINGS

FIG. 2 is an enlarged, fragmentary plan view of the tape of a first type of tape cassette for use with the apparatus of FIG. 1;

FIG. 3 is a similar view of the tape of a second type of tape cassette for use with the apparatus of FIG. 1;

FIG. 4, consisting of (A) and (B), is a waveform diagram useful in explaining how the first type of tape cassette is identified as such by the apparatus of FIG. 1;

FIG. 5, consisting of (A) and (B), is a waveform diagram useful in explaining how the second type of tape cassette is identified as such by the apparatus of FIG. 1;

FIG. 7 is a block diagram of alternative circuit means for discriminating between the first and second types of tape cassettes;

FIG. 8 is a view similar to FIGS. 2 and 3 but showing a possible alternative hole arrangement of the tape cassette to be identified in accordance with my invention;

FIG. 9 is also a view similar to FIGS. 2 and 3 but showing another possible alternative hole arrangement of the tape cassette to be identified in accordance with my invention; and FIG. 10 is a block diagram of a slight modification of the data reproduction circuit means in the apparatus of FIG. 1.

DESCRIPTION OF THE PREFERRED EMBODIMENTS

Figure 1:
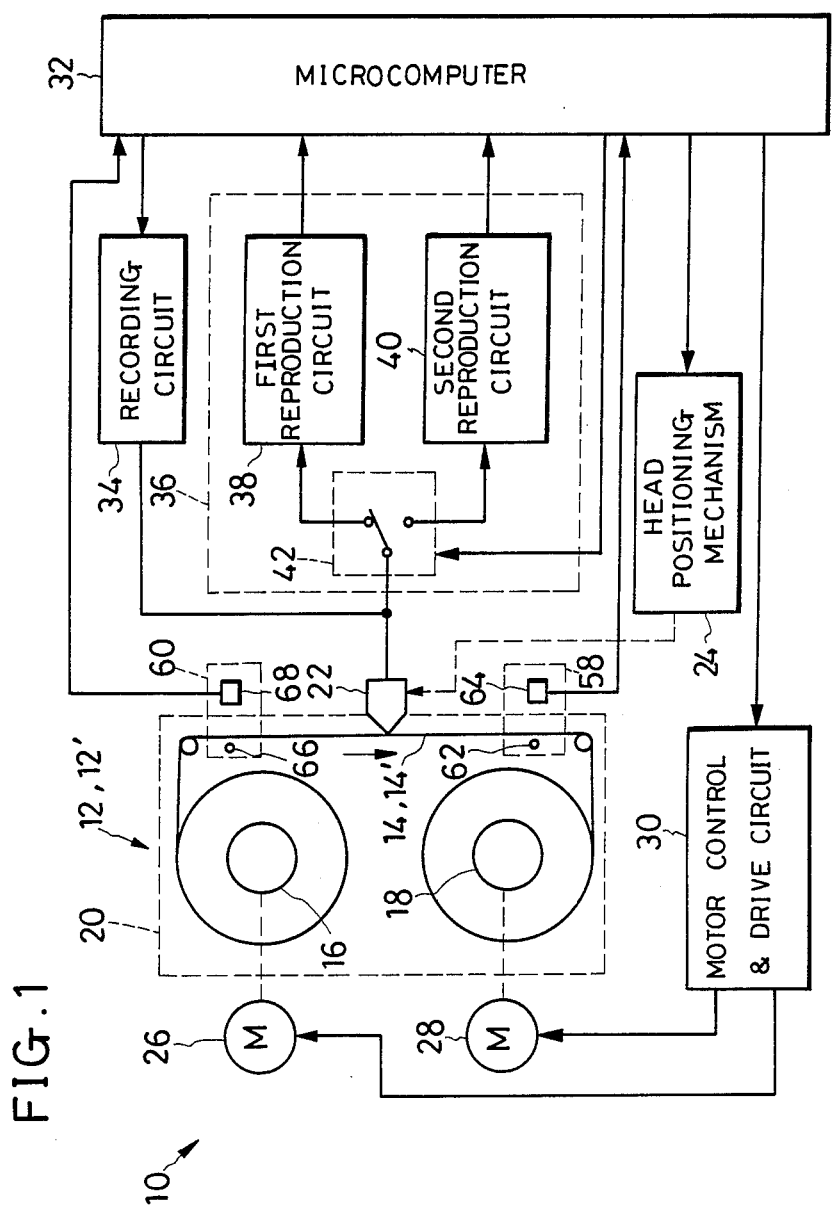
FIG. 1 is a block diagrammatic representation of the compatible digital magnetic tape cassette apparatus embodying the novel concepts of my invention, shown together with a tape cassette loaded therein.

The data transfer apparatus shown in FIG. 1 and therein generally designated 10 is constructed to read a first magnetic tape assembly 12, shown in cassette form, of relatively low recording density and to both read and write on a second magnetic tape assembly or cassette 12' of higher recording density. Since the two tape cassettes 12 and 12' can be of conventional construction and both of identical appearance, I have shown only one tape cassette mounted in position on the apparatus 10 and designated it 12, 12' for convenience. The tape cassettes 12 or 12' includes a length of multitrack magnetic tape 14 or 14' having its opposite ends anchored to a pair of hubs 16 and 18 rotatably mounted within a generally flat, boxlike housing 20. I will later describe the magnetic tapes 14 and 14' of the tape cassettes 12 and 12' in more detail with reference to FIGS. 2 and 3 as they differ in the arrangement of some optically detectable marks thereon.

Let us suppose that the hub 16 is a payoff hub, and the hub 18 a takeup hub, with respect to the predetermined forward direction of tape travel indicated by the arrow. The magnetic tape 14 or 14' will travel along a predefined path past a transducer or magnetic head assembly 22 forming a part of the data transfer apparatus 10. This head assembly 22 is of the known composite head type, being equipped for recording, reading and erasing data on the magnetic tape 14 or 14' during its forward and reverse travels. A known head positioning mechanism 24 is coupled to the head assembly 22 for incrementally moving the same across the data storage tracks, not shown, on the magnetic tape 14 or 14'.

The data transfer apparatus 10 has a pair of tape transport motors 26 and 28 which will drivingly engage the hubs 16 and 18, respectively, of the tape cassette 12 or 12' as the latter is loaded in position on the apparatus 10. A motor control and drive circuit 30 is electrically connected to both tape transport motors 26 and 28 for controllably driving them as dictated by a factory preprogrammed microcomputer 32 built into the apparatus 10.

Electrically connected to the head assembly 22 is a recording circuit 34 and reproduction circuit means 36. The recording circuit 34 is for use in recording data on the second tape cassette 12' of higher recording density. The microcomputer 32 is connected to the recording circuit 34 for controlling such recording of data on the second tape cassette 12' in the required format. The reproduction circuit means 36 comprises a first reproduction circuit 38 for data reproduction from the first tape cassette 12, and a second reproduction circuit 40 for data reproduction from the second tape cassette 12'. I understand that each of these reproduction circuits 38 and 40 comprises an amplifier, waveform shaping circuit, etc., for data reproduction from the associated tape cassette of different recording format. I have not illustrated such components of each reproduction circuit because of their conventional well known nature. Of course, the reproduction circuits 38 and 40 differ in the frequency characteristics of their constituent amplifiers and in other performance parameters. Both reproduction circuits 38 and 40 have their outputs connected to microcomputer 32.

The reproduction circuit means 36 is further shown to comprise, for the convenience of disclosure, a tape select switch 42 for selectively connecting the head assembly 22 to the first 38 or second 40 reproduction circuit under the control of the microcomputer 32. The tape select switch 42 connects the head assembly 22 to the first reproduction circuit 38 when the first tape cassette 12 is loaded in the apparatus 10 and, by means and in a manner set forth hereafter, identified as such. Further the tape select switch 42 connects the head assembly 22 to the second reproduction circuit 40 when the second tape cassette 12' is loaded and identified as such.

Reference is now directed to FIGS. 2 and 3 for a more detailed explanation of the magnetic tapes 14 and 14' of the tape cassettes 12 and 12'. With reference first to FIG. 2 the tape 14 of the first tape cassette 12 has an elongate, opaque magnetic data storage section 44, together with a transparent leader tape section 46 extending a relatively short distance a from the starting end, shown directed to the left, of the data storage section 44, and another transparent leader tape section 48 extending a short distance d from the finish end of the data storage section. A beginning-of-tape (BOT) hole 50 or like optically detectable aperture is formed in the data storage section 44 at a distance b from its starting position 52. An end-of-tape (EOT) hole 54 or like optically detectable aperture is also formed in the data storage section 44 at a distance c from its ending position 56. The starting position 52 of the data storage section 44 or, actually, of the magnetic tape 14 is the boundary between leader tape section 46 and data storage section 44. Likewise, the ending position 56 of the data storage section 44 or of the magnetic tape 14 is the boundary between data storage section 44 and leader tape section 48. Since the data storage section 44 is opaque, and the leader tape sections 46 and 48 transparent, the starting 52 and ending 56 positions of the tape are both detectable optically.

I have stated that the tape cassettes 12 and 12' can be of conventional design, with their tapes 14 and 14' having a width of 3.785 millimeter (mm). Typically, for this standard width magnetic tape 14, the lengths a and d of the leader tape portions 46 and 48 are each 500 mm plus or minus 50. The distances b and c of the BOT 50 and EOT 54 holes from the optically detectable boundaries 52 and 56 are each 1219 mm plus or minus 76 mm.

As illustrated in FIG. 3, the magnetic tape 14' of the second tape cassette 12' is of substantially the same make as the above described tape 14 of the first tape cassette 12 except that the tape 14' is greater in coercive force than the tape 14 for higher density recording. I have therefore indicated the various parts of the tape 14' merely by priming the reference numerals used to denote the corresponding parts of the tape 14. The lengths a' and d' of the leader tape portions 46' and 48' of the tape 14' are the same as those of the leader tape portions 46 and 48 of the tape 14, being each 500 mm plus or minus 50 mm. However, the distances b' and c' of the BOT 50' and EOT 54' holes from the optically detectable boundaries 52' and 56' are longer than the distances b and c, being each 2794 mm plus or minus 76 mm.

With reference back to FIG. 1 the data transfer apparatus 10 further comprises a BOT sensor 58 and EOT sensor 60. The BOT sensor 58 comprises a light source 62 and a photodetector 64 disposed opposite each other across the magnetic tape 14 or 14' of the loaded first 12 or second 12' tape cassette. The EOT sensor 60 likewise comprises a light source 66 and a photodetector 68 disposed opposite each other across the magnetic tape 14 or 14'. The photodetectors 64 and 68 are both connected to the microcomputer 32.

The BOT 58 and EOT 60 sensors are both standard components of this type of data transfer apparatus, having been used for optically detecting the BOT holes 50 and 50' and the EOT holes 54 and 54' in the tapes 14 and 14' for controlling the reading or writing of data thereon. I use the BOT sensor 58 as a part of the means for discriminating between the first 12 and second 12' tape cassettes in a manner that will become apparent from the following description of operation.

OPERATION

Let us assume that the first tape cassette 12 has just been loaded in the apparatus 10, with its magnetic tape 14 not completely wound on the payoff hub 16. As is conventional in the art, the tape 14 will be wound up on the payoff hub 16 as the motor control and drive circuit 30 energizes the first hub motor 26 in response either to the closure of the power switch, not shown, or to a command from the microcomputer 32. Then, with the first hub motor 26 deenergized, the second hub motor 28 will be set into rotation for driving the takeup hub 18 thereby causing the tape 14 to travel past the head assembly 22 in the direction of the arrow in FIG. 1.

I have shown in FIG. 4(A) the waveform of the signal fed from the BOT sensor 58 to the microcomputer 32 as the magnetic tape 14 starts traveling as above stated. Initially, when the photodetector 68 is being irradiated by the light source 66 via the transparent leader tape section 46 of the tape 14, the output from the BOT sensor 60 will be low. Then, at a moment t1, the BOT sensor output will go high as the opaque data storage section 44 of the tape 14 shields the photodetector 68 from the light source 66. However, the BOT sensor output will be low during a subsequent brief time interval of t2 to t3 when the BOT hole 50 of the tape 14 passes through the BOT sensor 60.

In response to the BOT sensor output the microcomputer 32 will start counting a prescribed length of time T1 as the BOT sensor output goes high at the moment t1. I have indicated the prescribed time T1 in FIG. 4(B) as a low voltage state. It will be seen that the time T1 lasts from moment t1 to moment t4, covering the expected time t2–t3 when the BOT sensor output will be low in response to the BOT hole 50 in the tape 14. Thus, if the BOT hole 50 is detected during the time T1, the microcomputer 32 will identify the first tape cassette 12 as such and will proceed to actuate the tape select switch 42 for connecting the head assembly 22 to the first reproduction circuit 38. The apparatus 20 is now ready for the commencement of data reproduction from the loaded first tape cassette 12.

The BOT sensor 58 will produce the output depicted in FIG. 5(A) when the second tape cassette 12' is loaded in the apparatus 10. The BOT sensor output will go high at the moment t1 when the boundary 52' between the transparent leader tape section 46' and opaque data storage section 44' of the tape 14' travels past the sensor 58. Then the BOT sensor output will become low from moment t3 to moment t4 during which time interval the BOT hole 50' of the tape 14' travels past the sensor 58.

As has been set forth, the distance b' of the BOT hole 50' in the tape 14' from the boundary 52' is greater than the distance b of the BOT hole 50 in the tape 14 from the boundary 52. Consequently, the time Tb from moment t1 to moment t3 in FIG. 5 is longer than the time Ta from moment t1 to moment t2 in FIG. 4. The microcomputer 32 may be programmed to start counting a second prescribed length of time T2 at the moment t2 in FIG. 5, which moment may be the same with the moment t4 in FIG. 4. As indicated in FIG. 5(B), the time T2 lasts from moment t2 to moment t5, encompassing the expected time interval t3–t4 during which the BOT hole 50' in the tape 14' is to be detected. If no BOT hole is detected during the first prescribed time T1, and if the BOT hole 50' is detected during the second prescribed time T2, then the microcomputer 32 will identify the loaded tape cassette as the second type 12'. If data reproduction from the identified second tape cassette 12' is then required, the microcomputer 32 will proceed to activate the tape select switch 42 for connecting the head assembly 22 to the second reproduction circuit 40. Of course, for operation in the recording mode, the microcomputer 32 will cause the recording circuit 334 to record desired data on the tape 14' via the head assembly 22.

I understand the BOT holes 50 and 50' in the tapes 14 and 14', detected by the BOT sensor 58, are utilized not only for discrimination between the two types of tape cassettes 12 and 12' in accordance with my invention but also for conventional purposes.

Figure 6:
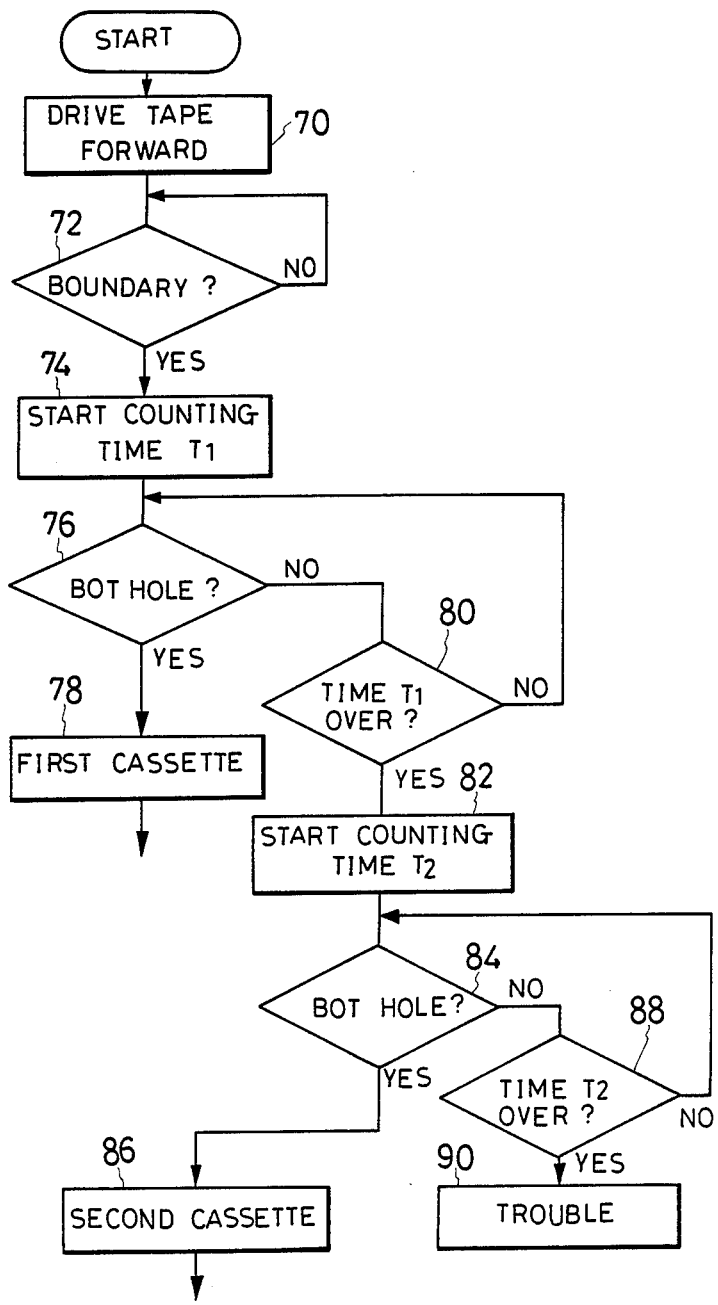
FIG. 6 is a flow chart explanatory of the program introduced into the microcomputer of the FIG. 1 apparatus in order to discriminate between the first and second types of tape cassettes.

I recommend that the microcomputer 32 be programmed as represented by the flow chart of FIG. 6 for the above discussed method of tape cassette discrimination in accordance with my invention. The process of tape cassette discrimination starts as aforesaid with the rewinding, if necessary, of the tape 14 or 14' of the loaded tape cassette 12 or 12' on the payoff hub 16, with the result that part of the leader tape section 46 or 46' of the tape becomes positioned in the BOT sensor 58.

Then, as indicated at 70 in FIG. 6, the tape 14 or 14' may be transported from payoff hub 16 to takeup hub 18. The BOT sensor 58 will then detect the boundary 52 or 52' between the transparent leader tape section 46 or 46' and the opaque data storage section 44 or 44' of the tape, as at 72, whereupon the microcomputer starts counting the first prescribed time T1, as at 74, and waits for the detection of the BOT hole 50 of the first tape cassette 12 by the BOT sensor 58 during that time, as at 76. If the BOT hole 50 is detected during the first prescribed time T1, the microcomputer 32 identifies the loaded tape cassette as the first type 12, as at 78.

The first prescribed time T1 will elapse with no BOT hole detected, as at 80, in cases where the second type tape cassette 12' has been loaded. Thereupon, at the end of the first prescribed time T1, the microcomputer 32 restarts counting the second prescribed time T2 as at 82 and waits for the detection of the BOT hole 50' of the second type tape cassette 12' during that time as at 84. Upon detection of the BOT hole 50' during the time T2 the microcomputer 32 identifies the loaded tape cassette as the second type 12', as at 86.

Possibly, as shown at 88, no BOT hole may be detected during the second prescribed time T2, either, because of the malfunctioning of the BOT sensor 58 or of the loading of a tape cassette other than those of the two compatible types 12 and 12'. In that case the microcomputer 32 generates a trouble signal, as at 90, which may be used for warning the user of the occurrence of trouble and for informing him of its possible causes.

Among the advantages gained by my invention, as embodied in the above disclosed data transfer apparatus 10, is the fact that the two types of tape cassettes 12 and 12' are accurately and readily discriminated by the conventional BOT sensor 58 which needs no alteration in construction or arrangement for performing the dual purpose of cassette identification and BOT hole detection. It will also be appreciated that the two types of tape cassettes 12 and 12' can share the cassette housing of the same construction as their identifies are ascertained by the distances b and b' of the BOT holes 50 and 50' from the optically detectable boundaries 52 and 52'. Although the distances b' and c7 of the BOT 50' and EOT 54' holes of the second tape cassette 12' are longer than the corresponding distances b and c of the first tape cassette 12, this will present no inconvenience at all since such longer spacings may be utilized for writing greater amounts of control data on these parts of the tape.

SECOND FORM

The preprogrammed computer is not the sole means for discriminating between the two different types of tape cassettes on the basis of the output from the BOT sensor in accordance with my invention. FIG. 7 shows a possible circuit arrangement 92 that may be employed in lieu of the microcomputer 32 in the data transfer apparatus 10 of FIG. 1, although the microcomputer itself may be left in the apparatus for other control functions well known to the specialists.

At 58 is shown in block form the BOT sensor set forth in connection with FIG. 1. The BOT sensor 58 is connected in this embodiment to a boundary detector circuit 94 which generates a trigger pulse upon detection of the optically detectable boundary 52 or 52' of the magnetic tape 14 or 14' of the tape cassette 12 or 12'. The output of the boundary detector circuit 94 is connected to a first monostable multivibrator (MMV) 96, which in turn has its output connected to both a first NOR gate 98 and a second MMV 100. The first NOR gate 98 has another input connected directly to the BOT sensor 58. The output of the second MMV 100 is connected to a second NOR gate 102, which has another input connected directly to the BOT sensor 58.

I will refer again to FIGS. 4 and 5 for the operational description of the above circuit arrangement 92. Triggered by the boundary detector circuit 94, the first MMV 96 will go low, as at the moment t1 in FIG. 4(B), and will remain so for the first prescribed time T1 lasting to the moment t4. If the tape cassette loaded now is of the first type 12, the BOT sensor 58 will go low upon detection of the BOT hole 50, FIG. 2, during the first prescribed time T1. In response to these outputs from the first MMV 96 and BOT sensor 58, the first NOR gate 98 will put out a pulse, as during the time interval t2-t3 in FIG. 4, indicative of the fact that the loaded tape cassette is of the first type 12.

If the loaded tape cassette is of the second type 12', on the other hand, then the first NOR gate 98 will remain low during the first prescribed time T1. Then, at the end t4, FIG. 4(B), of this first prescribed time T1, the second MMV 100 will be triggered by the first MMV 96 and remain low for the second prescribed time T2, as from moment t2 to moment t5 in FIG. 5(B). As the BOT sensor 58 detects the BOT hole 50', FIG. 3, of the second tape cassette 12' during the second prescribed time T2, the second NOR gate 102 will put out a pulse, as during the time interval t3-t4 in FIG. 5, representative of the fact that the loaded tape cassette is of the second type 12'.

MODIFICATIONS

Despite the foregoing detailed disclosure I do not wish my invention to be limited by the exact details of the illustrated embodiments. FIGS. 8 and 9 show two additional types of magnetic tapes capable of identification in accordance with my invention. The magnetic tape 14a shown in FIG. 8 has a series of three EOT holes 104 adjacent one tape end, and a set of six BOT holes 106 arranged in two parallel series adjacent the other tape end. A "Load Point" hole 108 is formed at a prescribed distance D from the last two (optically detectable starting position) of the BOT holes 106. An "Early Warning" hole 110 is formed at a prescribed distance D from the first of the EOT holes 104. The distance D may be varied from one type of tape assembly to another for discrimination by the same means as those shown in FIG. 1 or 7.

The magnetic tape 14b of FIG. 9 has six BOT holes 112 arranged in a row adjacent one tape end, and six EOT holes 114 arranged in a row adjacent the other tape end. A "Load Point" hole 116 is formed at a prescribed distance D from the last (optically detectable starting position) of the BOT holes 112, and an "Early Warning" hole 118 at a prescribed distane D from the first of the EOT holes 114. This magnetic tape 14b also lends itself to identication in accordance with my invention by changing the distance D from one type of tape assembly to another.

As will be noted by referring back to FIG. 1, I have therein shown the tape select switch 42 included in the reproduction circuit means 36. This showing is due to the fact that some component or components may be connected between head assembly 22 and tape select switch 42 so as to be used in common for data reproduction from both types of tape cassettes 12 and 12'. The provision of the two different self-contained reproduciton circuits 38 and 40 as in FIG. 1 is not a necessity. Thus, in modified reproduction circuit means 36a illustrated in FIG. 10, an amplifier 120 is connected by way of example between head assembly 22 and tape select switch 42 for amplification of data signals read from both types of tape cassettes 12 and 12'. The tape select switch 42 selectively connects the amplifier 120 to first 122 and second 124 data processing circuits depending upon whether the first or second type of tape cassette is loaded.

It is also understood that, contrary to the showing of FIG. 1, two separate recording circuits could be provided so as to be selectively coupled to the head assembly for writing on both types of tape cassettes or equivalent tape assemblies. Such recording circuits would differ in one or more of such recording characteristics as the magnitude of recording current, recording format and recording density.

Additional modifications or alterations of the above disclosed embodiments will occur to one skilled in the art without departing from the scope of my invention.

What I claim is:

1. An apparatus capable of selective data transfer with first and second tape assemblies on which data are recorded in different ways, the first tape assembly including a length of tape having an aperture formed therein at a first prescribed distance from an optically detectable starting position thereof, the second tape assembly including a length of tape having an aperture formed therein at a second prescribed distance, different from the first prescribed distance, from an optically detectable starting position thereof, the first and second tape assemblies being interchangeably loaded in and unloaded from the apparatus, the apparatus comprising:
   (a) a transducer for data transfer with the loaded first or second tape assembly;
   (b) tape transport means for transporting the tape of the loaded first or second tape assembly past the transducer;
   (c) data reproduction circuit means connected to the transducer for selective data reproduction from the first and second tape assemblies;
   (d) a tape select switch included in the data reproduction circuit means for selectively conditioning the same for data reproduction from the first or second tape assembly;
   (e) sensor means for optically detecting the aperture and starting position of the tape of the loaded first or second tape assembly, the sensor means producing an electric output indicative of the spacing between the starting position of the tape and the aperture therein; and
   (f) a control circuit responsive to the output from the sensor means for identifying the loaded first or second tape assembly on the basis of the spacing between the starting position of the tape of the loaded tape assembly and the aperture therein, the control circuit being connected to the tape select switch for actuating the same to condition the data reproduction circuit means for data reproduction from the loaded first or second tape assembly that has been identified as such.

2. The data transfer apparatus of claim 1 wherein the data reproduction circuit means comprises:
   (a) a first data reproduction circuit for data reproduction from the first tape assembly; and
   (b) a second data reproduction circuit for data reproduction from the second tape assembly;
   (c) the tape select switch being connected between the transducer and the first and second data reproduction circuit and actuated by the control circuit for supplying a data signal recovered from the first tape assembly by the transducer to the first data reproduction circuit, and a data signal recovered from the second tape assembly by the transducer to the second data reproduction circuit.

3. The data transfer apparatus of claim 1 wherein the data reproduction circuit means comprises:
   (a) a common amplifier connected to the transducer for amplifying data signals thereby recovered from both the first and second tape assemblies;
   (b) a first data processing circuit for processing the amplified data signal associated with the first tape assembly; and
   (c) a second data processing circuit for processing the amplified data signal associated with the second tape assembly;
   (d) the tape select switch being connected between the common amplifier and the first and second data processing circuits and actuated by the control circuit for supplying the amplified data signal associated with the first tape assembly to the first data processing circuit, and the amplified data signal associated with the second tape assembly to the second data processing circuit.

4. The data transfer apparatus of claim 1 wherein the control circuit is a preprogrammed computer.

5. The data transfer apparatus of claim 1 further comprising a recording circuit connected to the transducer for writing data on a preselected one of the first and second tape assemblies.

6. The data transfer apparatus of claim 1 wherein the tape of each of the first and second tape assemblies has a transparent leader tape section and an opaque data storage section, and wherein the optically detectable starting position of the tape is the boundary between the leader tape section and the data storage section.

7. The data transfer apparatus of claim 6 wherein the aperture in the tape of each of the first and second tape assemblies is a BOT hole formed in the data storage section of the tape, and wherein the sensor means comprises a BOT sensor.

8. The data transfer apparatus of claim 7 wherein the control circuit comprises:
   (a) a boundary detector circuit connected to the BOT sensor for generating an output pulse when the BOT sensor senses the starting position of the tape of the loaded first and second tape assembly;
   (b) a first monostable multivibrator responsive to the output pulse of the boundary detector circuit for generating an output pulse having a first prescribed duration;
   (c) a second monostable multivibrator connected to the first monostable multivibrator for generating an output pulse having a second prescribed duration upon disappearance of the output pulse of the first monostable multivibrator;
   (d) a first logic gate connected to the BOT sensor and the first monostable multivibrator for producing an output representative of the first tape assembly when the BOT sensor senses the BOT hole during the duration of the output pulse of the first monostable multivibrator; and
   (e) a second logic gate connected to the BOT sensor and the second monostable multivibrator for producing an output representative of the second tape assembly when the BOT sensor senses the BOT hole during the duration of the output pulse of the second monostable multivibrator.

9. The data transfer apparatus of claim 1 wherein the tape of each of the first and second tape assemblies has a set of BOT holes formed adjacent one end thereof to provide the optically detectable starting position, and wherein the aperture is a Load Point hole formed in the tape and spaced from the set of BOT holes toward the other end of the tape.

* * * * *